United States Patent [19]

Allaire et al.

[11] 4,130,787

[45] Dec. 19, 1978

[54] RELIABILITY MONITORING SYSTEM

[75] Inventors: William P. Allaire, St. Peters, Mo.; William J. Mayer, Belleville, Ill.; Thomas A. Zambetis, Hazelwood, Mo.

[73] Assignee: McDonnell Douglas Corporation, St. Louis, Mo.

[21] Appl. No.: 776,307

[22] Filed: Mar. 10, 1977

[51] Int. Cl.² .............................................. G05B 23/02
[52] U.S. Cl. ..................................... 318/565; 318/612
[58] Field of Search ................................. 318/565, 612

[56] References Cited

U.S. PATENT DOCUMENTS

| | | | |
|---|---|---|---|
| 3,470,428 | 9/1969 | Gill et al. | 318/612 X |
| 3,576,979 | 5/1971 | McCall | 318/565 X |
| 3,633,087 | 1/1972 | Vawter | 318/565 |
| 3,996,454 | 12/1976 | Froyd | 318/565 X |
| 4,030,012 | 6/1977 | Buhler | 318/565 |
| 4,934,185 | 1/1976 | Schoonover et al. | 318/565 |

*Primary Examiner*—B. Dobeck

*Attorney, Agent, or Firm*—Lionel L. Lucchesi

[57] ABSTRACT

A system for monitoring a machine tool under automatic control is provided which uses the actual path of the tool in all directions of motion for comparison with a mathematically ideal path to detect tool error. Machine tool position is obtained from independent feedback devices on each axis of tool movement. The system monitors the machine control commands independently of a machine control command generating means, the machine control command generating means commonly bring a computer of a conventional type. Thus, a monitoring loop is placed about the entire machine tool, that loop being capable of detecting malfunction or mispositioning of the tool, as that tool operates under automatic control. An independent dynamic braking means enables the system of this invention to bring the machine to a stop without part scrappage in the event of a machine shut down, occurring for example, because of a power system failue, or mispositioning error detection.

12 Claims, 6 Drawing Figures

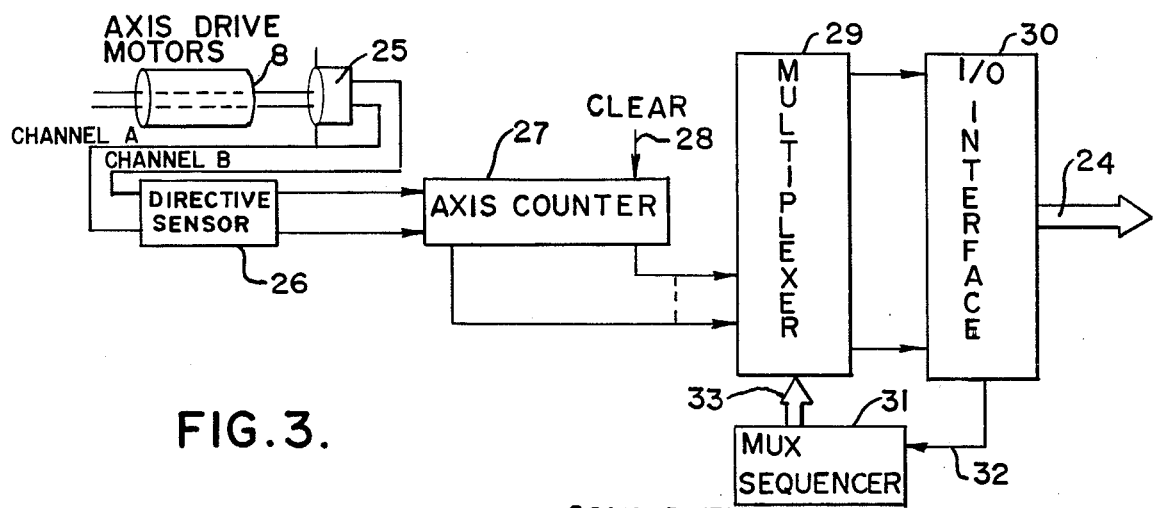
FIG. 3.
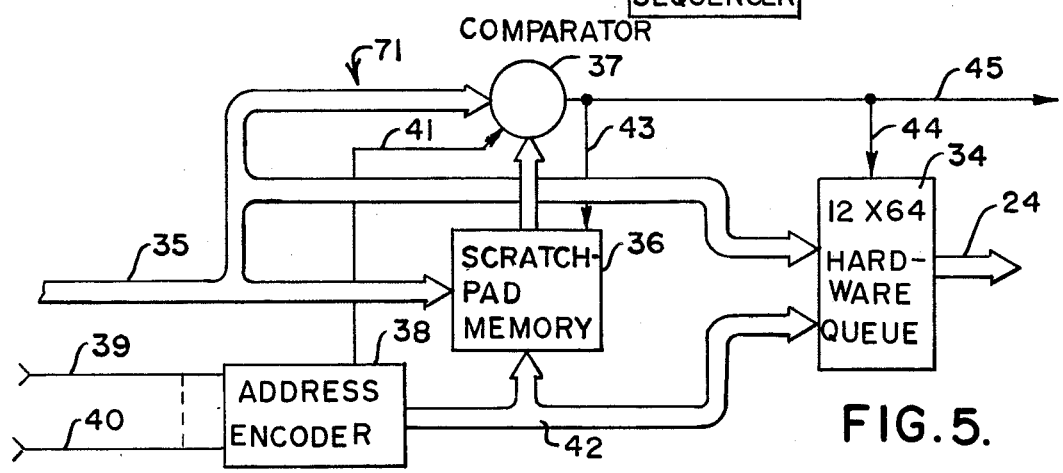
FIG. 5.
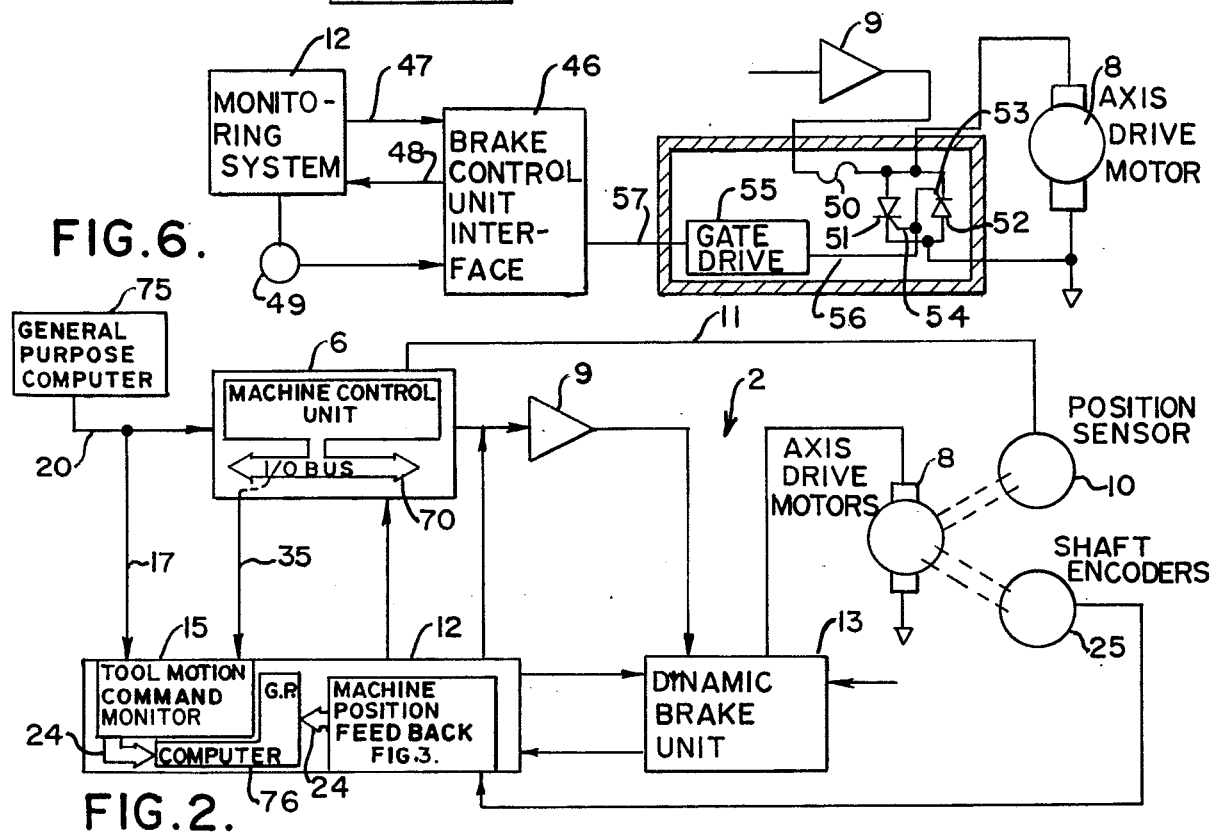
FIG. 6.
FIG. 2.

RELIABILITY MONITORING SYSTEM

BACKGROUND OF THE INVENTION

This invention relates to machine tools, and in particular, to a system for detecting error in the positioning of the machine tool and for stopping machine tool operation before the mispositioning error causes destruction of the part under manufacture. While the invention is described with particular reference to its use in conjunction with the manufacturing of aircraft frame parts, those skilled in the art will recognize the wider applicability of the inventive principles disclosed hereinafter.

Computer controlled machine tools have become generally available for the manufacture of precision, close tolerance parts. One generally available machine tool includes a machine bed for holding the parts and a gantry having a suitable milling device mounted to it. The gantry rides above the bed and both the gantry and milling device are controlled by a general purpose computer. The milling device commonly is movable in three directions of movement, those being the three planes of a conventional Cartesian Coordinate system denominated as the X, Y and Z planes, along with clockwise and counterclockwise rotational movement in each of those planes. Suitable drive motors are provided for driving the milling device along the X, Y and Z axes of the coordinate system. The direction of rotation and the position of the milling device along the X, Y and Z axes commonly are a function of a computer input to the machine tool. Other conventional machine tools provide at least a work surface for holding a workpiece and means for moving the cutter with respect to the workpiece.

Machine tools as thus generally described are well known in the art. They are used extensively by aircraft manufacturers, for example, to construct precision frame members used in the air frames of general purpose and military aircraft. Because of their precise construction, individual parts manufactured on the machine tools which the invention disclosed hereinafter finds application represent a substantial investment. Machine down time also represents a serious loss in productivity with resulting increased product cost.

Most computer operated machine tool devices provide some form of servo error detection on an individual axis basis. Commonly utilized servo error detection circuitry utilized in conjunction with those devices use the electronic measurement of following error to determine machine malfunction. A malfunction is detected only when the following error is very large, generally on the order of 0.100 to 0.200 inches, or larger. The resolution is very coarse since the normal following error of the machine tool should not cause servo error indication. An improved monitoring system has been developed which checks the magnitude of the machine following error against a predicted value based on velocity of the slide holding the particular milling tool. While the sensitivity of this latter device is an order of magnitude better, i.e., it may detect positioning error of 0.010 inches, the system only checks the performance of the servo electronics, and does not take into account errors in the input command decoding logic. Additionally, both of the systems described above depend on the tool's existing feedback system to perform their checks. Consequently, a number of malfunctions still may occur with the resultant loss of machine time and material.

The invention described hereinafter overcomes these prior art deficiencies by implementing a system employing a total redundancy check concept. That is to say, the system monitors the commands to the machine tool in parallel with a machine control unit conventionally associated with the machine tool, and independently decodes them. Machine tool position is monitored with independent feedback devices on each axis. The system compares machine tool position with the mathematically ideal path commanded by the controlling computer. Thus, both individual single axis error and vector error caused by several small axis errors can be detected. In effect, a monitoring loop is put around the entire machine tool system, the loop being capable of detecting any malfunction concerning the position of the tool. The system also monitors the status of the machine control unit and requires certain functions to be performed by the machine operator before the operator can place the machine in automatic control operation. This monitoring function eliminates many areas of possible human error.

One of the objects of this invention is to provide an improved system for ensuring the reliablity of machine tool operation.

Another object of this invention is to provide a reliability system for a machine tool which monitors the entire machine tool operation.

Another object of this invention is to provide a monitoring system which compares the mathematically ideal position of a machine tool with the position of the tool as determined by sensors which function independently of machine tool operation.

Another object of this invention is to provide a dynamic braking system for shutting down machine tool operation upon the detection of a position error of the tool.

Other objects of this invention will be apparent to those skilled in the art in light of the following description and accompanying drawings.

SUMMARY OF THE INVENTION

In accordance with this invention, generally stated, a monitoring system is provided which receives and independently decodes movement commands to a machine tool simultaneously with the presentation of those commands to a machine control unit of the machine tool. The system includes independent axis position sensors and means for comparing the actual position of the machine tool with the idealized mathematical model. Error detection causes the system of this invention to command machine tool operation shut down. Error detection is much more precise at cutting velocities of the machine tool, enabling the system of this invention to shut down machine operation in case of malfunction before scrappage occurs. Dynamic brake means are provided to bring the drive motors of the machine tool to rest quickly in the event of machine tool shut down.

BRIEF DESCRIPTION OF THE DRAWINGS

In the drawings,

FIG. 2 is a block diagram view of one illustrative embodiment of reliability system of this invention;

FIG. 3 is a more detailed block diagrammatic view of a machine position feedback system means utilized in conjunction with the reliability system of FIG. 2;

FIG. 5 is a more detailed block diagrammatic view of a processor means used in conjunction with the reliability system of FIG. 2; and FIG. 6 is a more detailed block diagrammatic view of a dynamic brake unit used in conjunction with the reliability system of FIG. 2.

DESCRIPTION OF THE PREFERRED EMBODIMENT

Figure 1:
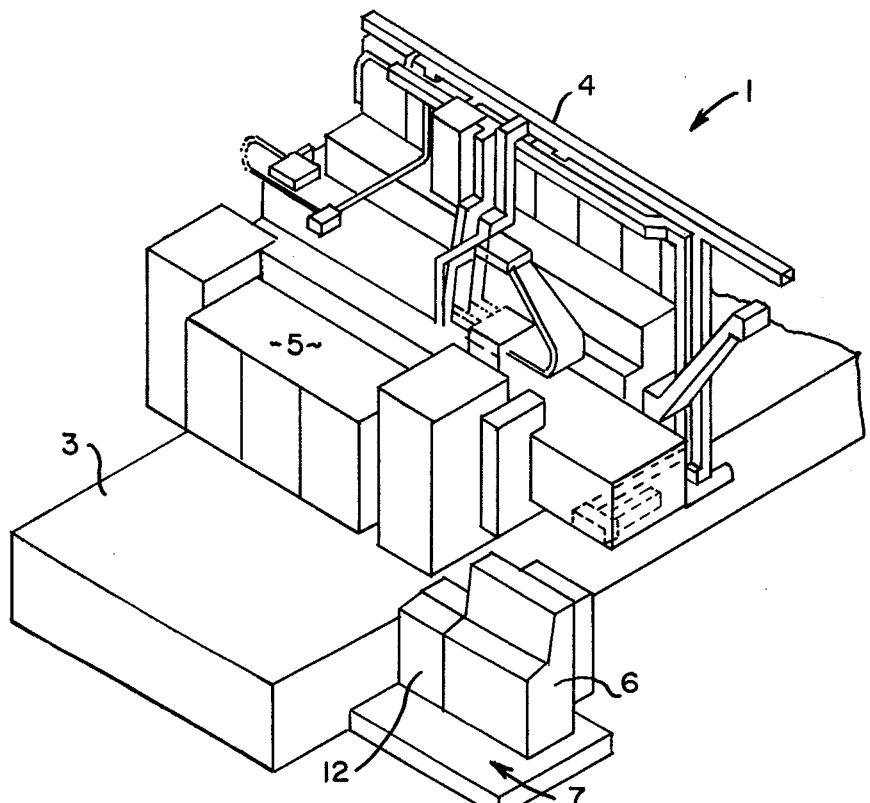
FIG. 1 is a view in perspective, partly broken away, of a machine tool with which the system of this invention finds application.

Referring now to FIGS. 1 and 2, reference numeral 1 indicates a machine tool in which one illustrative embodiment of reliablity monitoring system 12 finds application.

The machine tool 1 generally is available commercially and may comprise, for example, a conventional Cincinnati five axis gantry device, commonly including a bed 3 for supporting a work piece and a gantry 4 movable with respect to the bed 3. The gantry 4 has a plurality of slides 5 movably supported on it. The slides 5, in turn, have suitable milling or drilling means attached to them which are mounted for movement with respect to the gantry 4 and bed 3. In general, the slides 5 of the tool 1 are movable in X, Y and Z planes of a conventional Cartesian coordinate system, and are rotatable clockwise and counterclockwise in each or combinations of those planes.

A machine control unit 6 is conventionally located at an operator's station 7 and is electrically connected between the operating mechanism of the tool 1 and a conventional general purpose computer 75. The computer 75 is programmed to generate a preselected mathematical data path defining the travel limits for the slides 5 and that data is transmitted through the machine control unit 6 to the slides 5. The machine control unit 6 functions to convert the numerical data from the computer 75 into analog positioning functions for driving a plurality of drive axis motors 8 through a conventional servo drive system represented by the reference numeral 9 in FIG. 2. Conventionally, the tool 1 has a plurality of suitable position sensors 10, respective ones of which are operatively connected to each of the axis drive motors 8 to provide slide 5 position feedback information along a conductor 11 to the machine control unit 6. The machine control unit 6 utilizes the feedback position data to continue the programmed sequence of machine 1 operation. The machine control unit 6 then essentially is a special purpose computer which functions to specifically control machine 1 operation in accordance with path data supplied from the general purpose computer 75.

Figure 4:
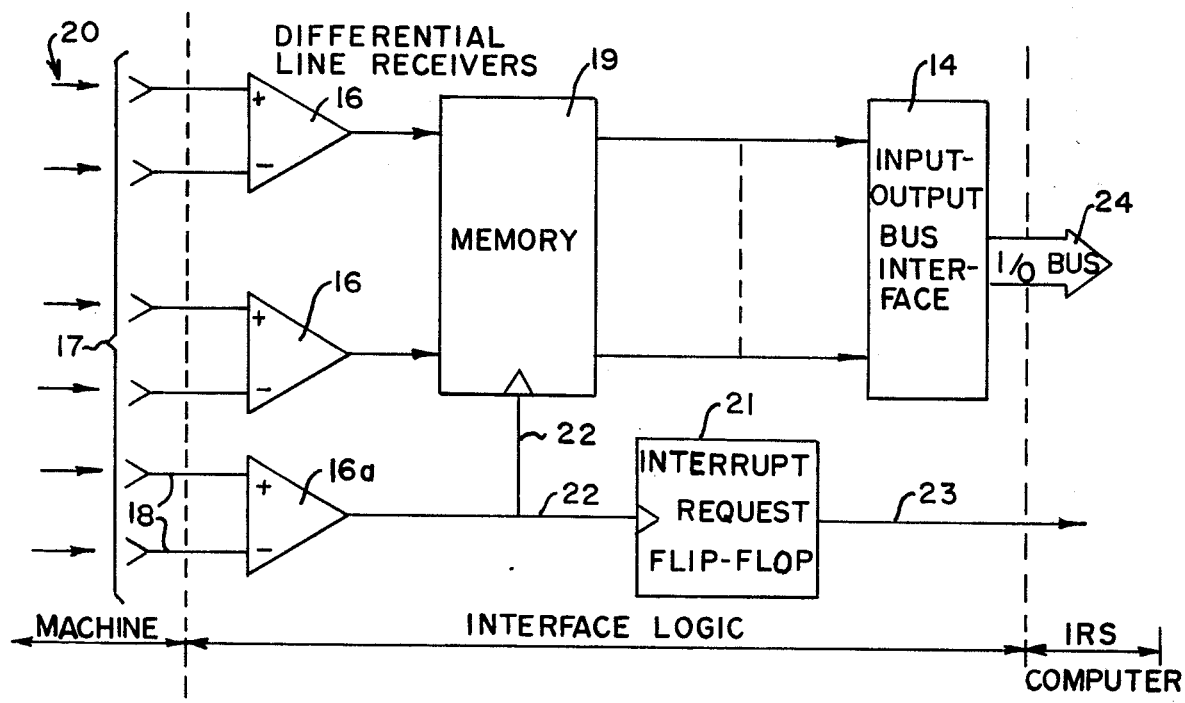
FIG. 4 is a detailed block diagrammatic view of the interface logic utilized between command input of the machine shown in FIG. 1 and the reliability system of FIG. 2.

As thus described, the system shown in FIG. 2 is conventional. Our invention modifies this conventional system by providing the reliablity monitoring system 12 for monitoring tool 1 operation, the monitoring system possessing the ability to shut down the tool 1 in those cases where a tool 1 malfunction is detected. For that purpose, reliability monitoring system 12 utilizes a dynamic braking unit 13. In general, the reliability monitoring system 12 places a check loop around the entire machine tool 1 system which is capable of detecting any malfunction concerning mispositioning of the tool slides 5 under automatic control. Tool motion command data from the general purpose computer 75 conventionally is fed to the machine control unit 6 along a data bus 20 in bit parallel form using differential line drivers. The monitoring system 12 has a plurality of line receivers 16, best seen in FIG. 4, in parallel with similar line receivers conventionally contained in the machine control unit 6. A ready signal on the bus 20 is fed to an input 18 of a line receiver 16a of a tool motion command monitor portion 15 of the system 12 along a bus 17. A ready signal at the input 18 of the receiver 16a is used to latch the data from the remaining line receivers 16 in a memory means 19 and to set an interrupt request signal at a flip-flop 21 via a conductor 22. An output 23 from the flip-flop 21 signals the monitoring system 12 that data is available in the memory 19, which data is thereafter accepted by the monitoring system 12 along a suitable interface means 14 operatively connected to an input-output (IO) bus 24 of the monitoring system 12. The memory 19 essentially is a sixteen bit latch or one word memory. Use of the machine tool 1 position data input so obtained is described in greater detail hereinafter.

Referring now to FIG. 3, it may be observed that machine tool 1 position is monitored using incremental shaft encoders 25 operatively connected to respective ones of the axis drive motors 8. Output of the shaft encoders 25 forms an input to a direction sensor 26, the output of which is an input to an axis counter 27. Those skilled in the art will recognize that only a single axis representation is shown in FIG. 3. Actual embodiments of the system 12 require a similar arrangement of each axis of slide 5 movement. The single axis presentation facilitates operational description and simplifies drawing figure presentation. The counter 27 is a binary up-down counter which can be reset under program control along an input 28. A clear signal at the input 28 may be generated, for example, by the monitoring system 12 whenever the tool 1 is positioned at its initial set point location. The use of the axis counter 72 for monitoring slide 5 position is an important feature of our invention. The position of the slides 5 is maintained in the up-down counters 27 without program intervention, the counters maintaining an indication of the absolute distance of the slides 5 from the initial set point thereof. Consequently, an effective, low cost and accurate method for monitoring slide 5 position is provided.

Output of the various counters 27 for each direction of movement monitored by the counters 27 forms an input to a sixteen channel multiplexer 29. Multiplexer output passes through a suitable input-output (IO) bus interface 30 to the input-output (IO) bus 24 of the monitoring system 12. The multiplexer 29 output is sequenced by a multiplex sequencer means 31 which receives a command input from the bus 24 and interface 30 along an input 32, an output 33 of the sequencer 31 commanding the output sequence of the multiplexer 29. The counters 27 are multiplexed so that the monitoring system 12 can read all of the counters with one command along the input-output bus 24 with a minimum of program overhead.

In the area of monitoring the machine control unit 6 status, the reliablity system 12 implements a unique approach to the problem of monitoring a computer without the cooperation of the computer being monitored. As indicated above, the machine control unit 6 essentially is a special purpose computer and all information required for machine tool 1 operation passes through that unit. Consequently, all switches, contacts, etc., for controlling the tool 1 operate as digital inputs to the machine control unit 6. Display devices available from the machine control unit 6, on the other hand, are digital outputs from the special purpose computer of the machine control unit 6. Meaningful data on the state of these devices is only available at the time when the computer of the machine control unit 6 reads or writes them. However, at that time, the data is all available in the same place, that is, on an input-output (IO) 70 bus of the machine control unit 6. The special purpose computer of the machine control unit 6, in the embodiment illustrated, uses a polling system in its operation. That is to say, the machine control unit 6 computer comes around and periodically checks the operational state of the machine tool 1. Because of this fact, the reliability monitoring system 12 can detect what is being examined by the machine control unit 6 computer by utilizing the input-output strobe pulse that the machine control unit 6 computer generates for its own internal synchronization. However, the fact that the machine control unit 6 computer is a polling system introduces another problem. As indicated, the system 12 can detect what is being examined by the machine control unit 6 computer by utilizing the input-output (IO) strobe pulse that the machine control unit 6 computer generates for its own internal synchronization. In the embodiment illustrated, each such pulse is unique to an 8-bit group of inputs or outputs. Duplicating the logic of the machine control unit 6 computer would be a tremendous and costly burden to place on the reliability system 12.

To eliminate the requirement of logic duplication, a small (approximately 15-20 SSI (small scale integration) and MSI (medium scale integration) integrated circuits) special processor 71 is used in the reliability system 12. As illustrated in FIG. 5, an input 35 provides the desired information from the machine control unit data bus 70 and stores that information in a scratch pad memory 36. As indicated above, each pulse along the input 35 is a unique eight bit group of inputs or outputs. The monitoring means 12 keeps the last known state of each input-output group of interest in the memory 36. Each time a group is strobed, the memory 36 receives the new information. That information also forms an input to a comparator 37 and a 12 by 64 bit hardware queue 34. An address encoder 38 receives sixteen strobe inputs, represented for clarity in FIG. 5 by an input 39 and an input 40, which correspond to the strobe synchronization from the machine control unit 6 computer and which are used to correlate the data into and from the various elements of the processor 71. The address encoder 38 has an output 41 to the comparator 37, and an output 42 connected both to the scratch pad memory 36 and to the 12 by 64 hardware queue 34. The comparator 37 has an output 45, which is operatively connected to the scratch pad memory 36 along a conductor 43 and to the hardware queue 34 along a conductor 44. Output of the hardware queue 34 is provided along the input-output bus 24.

The processor 71 of the monitoring means 12 keeps the last known state of each input-output group of interest in the scratch pad memory 36. Each time the group is strobed by the machine control unit, the processor 71 compares the new data on the input 35 with the last known data from the memory 36 in the comparator 37. If they are equal, the processor 71 does nothing. If the data is different, however, the processor 71 takes two actions. First, it commands the storage of the new data in the scratch pad memory 36 along the conductor 43. Second, it saves the new data along with a code to identify it for further use in the monitoring system computer 76 at the output 45. Upon receipt of that signal, the computer 76 accepts the information from processor 71 and updates its internal status indicators.

Periodically, an internal timer means, now shown, generates a suitable signal to the computer 76. Upon receipt of that signal, the computer 76 compares the actual machine tool position with the idealized path data, and sends stopping commands to the dynamic brake unit 13 and the machine control unit 6 when the comparison falls without some predetermined range. This approach frees a tremendous amount of computer time for other functions in the system, thereby eliminating any need for a faster, more expensive computer to perform the same functions.

It will be apparent, to those skilled in the art, that the reliability system 12 may utilize an improved operator interface at the operator's station 7. For example, in the embodiment illustrated, although not shown, the operator console contains eight push buttons, one twelve position rotary switch, a display unit with eight back lighted legends and a general purpose 32 character alpha numeric display. The switches are all software defined, and are used to coordinate system 12 operation with the machine tool 1 operator during machine set up. Any push button generates a computer 76 interrupt, which causes the computer 76 to read switches and take appropriate action. The eight lamp display is used to display running status information to the operator. The alpha numeric display is used for many purposes. In the set up mode, it provides English language feedback to the operator when he makes an error. In normal operation, it displays a running estimate of machine performance. During a shut down, it displays a reason for the shut down and various useful maintenance data on command from the operator console. This ability to provide data independently of the machine tool 1 enables personnel to quickly find machine trouble and eliminate down time of the tool 1, and is a direct result of the independent system approach of the reliability monitoring system 12.

The dynamic brake unit 13 is best illustrated in FIG. 6. As there shown, the reliability monitoring system 12 is operatively connected to an interface unit 46 along an output conductor 47 and an input conductor 48. Control commands are sent to the brake control interface 46 along the conductor 47, and status information is returned to the monitoring system 12 along the conductor 48. A key switch disable means 49 may be provided to manually disable the dynamic braking unit 13, if desired, and one such means is illustrated in the drawings.

The servo system 9 is operatively connected to respective ones of the axis drive motors 8 through a fuse 50 and a pair of silicon controlled rectifiers 51 and 52. A gate 53 and a gate 54 of the SCRs 51 and 52 respectively are connected to a gate drive means 55 along a conductor 56. Gate drive means 55 in turn is operatively connected to the interface 46 along a conductor 57. The SCRs 51 and 52 are connected in inverse parallel relationship and the gate drive means 55 preferably is a suitable oscillator adapted to provide gating signals to the SCRs. The interface 46 primarily is required to provide status information to the monitoring system 12 which indicates when the SCRs are ready to fire. The monitoring system 12 uses the status information in conjunction with the error detection signal from the computer 76 to initiate machine tool 1 shut down.

In operation, the dynamic brake unit, on command from monitoring system 12 fires the SCRs 51 and 52 which are connected in parallel with the axis drive motor 8 on each axis. The mechanical energy of the motor is then translated by the motor, acting as a generator, into electrical energy. The electrical energy, in turn, is dissipated as heat in the SCR 51 and SCR 52. Stopping distances achieved with this system typically are less than 0.010 inches at typical cutting velocities.

Numerous variations, within the scope of the appended claims, will be apparent to those skilled in the art in light of the foregoing description and accompanying drawings. Thus, various design features described herein may be independently used in other embodiments of this invention. The monitoring system 12 makes use of an Interdata mini processor computer commercially available and programmed in accordance with the inventive aspects set forth above. The specification enumerates a number of conductors for electrically connecting various assemblies of our invention. Those skilled in the art will recognize that the diagrammatic illustration of single conductors merely facilitates the verbal description of the circuit under consideration and that single conductors shown may be conductor pluralities in commercial embodiments of this invention. Although extensive use of block diagrams have been employed in the disclosure, the information thus shown and described should enable competent practioners to construct physical circuits from the block diagram shown. If additional circuit design information is desired, it may be obtained, for example, in *Interdata Users Manual*, No. 29-261 (1973 Edition). Although described in conjunction with respect to air frame manufacture, system modularity is such that it may be adapted readily to any control system where positioning errors are costly and undesirable for a variety of other reasons. These variations are merely illustrative.

Having thus described the invention, what is claimed and desired to be secured by Letters Patent is:

1. A system for monitoring operation of a computer controlled machine tool, said machine tool including a machine control unit having an input operatively connected to said computer and an output operatively connected to said machine tool along an input-output bus, data on the input-output bus of said machine control unit operating said machine tool, comprising:
    means for receiving idealized path data for said machine tool from the input side of said machine control unit;
    means for detecting changes of state in the transient data on the input-output bus of said machine control unit;
    means dedicated to the monitoring system for determining the actual position of said machine tool independently of any other tool position monitoring means;
    means for comparing the idealized path data for said machine tool with the actual position of the machine tool as determined by said dedicated means for determining actual machine tool position; and
    means for indicating machine tool malfunction when the data collected by said monitoring system from one of the input-output bus of the machine control unit and the actual machine tool position determined by the dedicated means for determining actual tool position falls outside a predetermined value.

2. The system of claim 1 wherein said means for indicating machine tool malfunction includes means for commanding machine stoppage to the machine control unit of the machine tool.

3. The system of claim 2 further including means for generating a stop signal to a drive means for the machine tool, said stop signal generating means being responsive to the machine tool malfunction indication.

4. The system of claim 3 wherein the drive means of said machine tool comprises at least one dynamoelectric machine, said stop signal being implemented by dynamic brake means, said brake means comprising first and second silicon control rectifiers connected in parallel to said dynamoelectric machine, said dynamoelectric machine being connected to a source of electrical energy, and gate drive means connected to the gate electrode of each of said silicon control rectifiers.

5. The improvement of claim 1 wherein said idealized path data receiving means includes interface means comprising a plurality of differential line receivers, memory means having an input side connected to said differential line receivers and an output side operatively connected to an input-output bus of said monitoring system.

6. The system of claim 5 wherein said means for detecting changes of state in the transient data on the input-output bus of said machine control unit comprises processor means including scratch pad memory means operatively connected to the input-output bus of said machine control unit, comparator means operatively connected to said scratch pad memory and the input-output bus of said machine control unit, and means for addressing said scratch pad memory and said comparator to provide data representation of a first data bit for comparison with a second data bit of a same group but later in time.

7. The system of claim 6 wherein said means dedicated to the monitoring system for determining actual machine tool position comprises shaft encoder means for following the position of said tool slide drive means, and counter means responsive to the output of said shaft encoder means for maintaining the position of said drive means from an initial set point condition.

8. In a computer controlled machine tool having a computer for controlling machine tool operation, said machine tool including a machine control unit for operating said machine tool, said machine control unit having an input-output bus, at least one tool slide movably mounted to said machine, and means for driving the tool slide, said drive means being operatively connected to said machine control unit, the improvement which comprises independent system means for monitoring machine tool operation, said system means including means for receiving idealized path data for said machine tool from said computer simultaneously with that data transmission to said machine control unit, means for detecting changes of state in the transient data on the input-output bus of the machine control unit, means dedicated to the monitoring system for determining actual machine tool position independently of any other tool position monitoring means, means for comparing the idealized path data for said machine tool with the actual position of the machine tool as detected by said dedicated means for determining actual machine tool position, and means for indicating a malfunction when the data available to said monitoring means from one of the input-output bus of the machine control unit and the comparing means falls outside a control value.

9. The improvement of claim 8 wherein said data path receiving means is connected to a data bus input for said machine control unit, said receiving means including interface means comprising a plurality of differential line receivers, memory means having an input side connected to said differential line receivers and an output side operatively connected to said monitoring system means.

10. The improvement of claim 9 wherein said means for detecting changes of state in the transient data on the input-output bus of the machine control unit comprises processor means including scratch pad memory operatively connected to the input-output bus of said machine control unit, comparator means operatively connected to said scratch pad memory and the input-output bus of said machine control unit, and means for addressing said scratch pad memory and said comparator to provide data representation of a first bit for comparison with a second data bit of a same group but later in time.

11. A system for manufacturing a machined part, comprising:
- a computer;
- a machine tool controlled by said computer, said machine tool including a machine control unit having an input operatively connected to said computer and an input-output bus for operating said machine tool, at least one tool slide movably mounted to said machine, and means for driving the tool slide, said drive means being operatively connected to the input-output bus of said machine control unit; and
- independent system means for monitoring machine tool operation, said monitoring means comprising:
  - means for receiving idealized path data for said machine tool from the input side of said machine control unit;
  - means for detecting changes of state in the transient data on the input-output bus of the machine control unit;
  - means dedicated to the monitoring system for determining actual machine tool position from said machine tool;
  - means for comparing the idealized path data for said machine tool with the actual position of the machine tool as determined by said dedicated means for determining actual machine tool position; and
  - means for indicating a malfunction when the data collected by said monitoring system from one of the input-output bus of the machine control unit and the actual machine tool position falls outside a predetermined value.

12. A system for monitoring operation of a computer controlled machine tool, said machine tool including a machine control unit having an input operatively connected to said computer and an output operatively connected to said machine tool along an input-output bus, data on the input-output bus of said machine control unit operating said machine tool, comprising:
- means for receiving idealized path data for said machine tool from the input side of said machine control unit;
- means for detecting changes of state in the transient data on the input-output bus of said machine control unit;
- means for determining the actual position of said machine tool;
- means for comparing the idealized path data for said machine tool with the actual position of the machine tool as determined by said means for determining actual machine tool position; and
- means for indicating a malfunction when the data collected by the monitoring system from one of the input-output bus of the machine control unit and the actual machine tool position falls outside a predetermined valve.

* * * * *

UNITED STATES PATENT AND TRADEMARK OFFICE
CERTIFICATE OF CORRECTION

PATENT NO. : 4,130,787
DATED : December 19, 1978
INVENTOR(S) : Allaire et al

It is certified that error appears in the above-identified patent and that said Letters Patent are hereby corrected as shown below:

Column 4, line 36 delete "72" and insert --- 27 ---

Column 5, line 50 "12 by 64" should not be in bold face type.

Signed and Sealed this

Fifteenth Day of May 1979

[SEAL]

Attest:

RUTH C. MASON
Attesting Officer

DONALD W. BANNER
Commissioner of Patents and Trademarks